US008281479B2

(12) United States Patent
Sharrah et al.

(10) Patent No.: US 8,281,479 B2
(45) Date of Patent: Oct. 9, 2012

(54) STYLUS FLASHLIGHT HOUSING AND METHOD FOR MAKING SAME

(75) Inventors: Raymond L. Sharrah, Collegeville Borough, PA (US); Charles W. Craft, Lansdale, PA (US)

(73) Assignee: Streamlight, Inc., Eagleville, PA (US)

( * ) Notice: Subject to any disclaimer, the term of this patent is extended or adjusted under 35 U.S.C. 154(b) by 1216 days.

(21) Appl. No.: 11/400,402

(22) Filed: Apr. 6, 2006

(65) Prior Publication Data

US 2006/0181870 A1 Aug. 17, 2006

Related U.S. Application Data

(60) Division of application No. 29/178,984, filed on Apr. 2, 2003, now Pat. No. Des. 521,164, which is a continuation of application No. 29/161,696, filed on Jun. 3, 2002, now abandoned, and a continuation of application No. 10/238,807, filed on Sep. 9, 2002, now Pat. No. 6,857,758, which is a division of application No. 10/047,536, filed on Jan. 14, 2002, now Pat. No. 6,491,409, which is a division of application No. 09/511,876, filed on Feb. 25, 2000, now Pat. No. 6,402,340.

(51) Int. Cl.
*B21D 22/00* (2006.01)
*B23P 13/04* (2006.01)
*F21L 4/00* (2006.01)

(52) U.S. Cl. .......... 29/527.4; 29/557; 29/592.1; 72/349; 362/157; 362/202

(58) Field of Classification Search .................... 72/276, 72/283, 284, 85, 350, 370.2, 379.2, 349; 29/527.2, 527.4, 527.6, 592.1, 557; 362/205, 362/206, 194, 457, 202, 17
See application file for complete search history.

(56) References Cited

U.S. PATENT DOCUMENTS

| | | | | |
|---|---|---|---|---|
| 1,264,520 | A | 4/1918 | Holmes | |
| 1,487,983 | A | 3/1924 | Stiriss | |
| 1,607,647 | A | 11/1926 | Seikot | |
| 1,623,807 | A * | 4/1927 | Oakley | 72/82 |
| 1,810,524 | A | 6/1931 | Lyhne | |
| 1,919,024 | A | 7/1933 | Abbotts | |
| 2,183,861 | A * | 12/1939 | Cotter, Sr. | 72/44 |
| 2,966,872 | A * | 1/1961 | Schmocker | 72/55 |
| 3,041,717 | A * | 7/1962 | Brown | 29/446 |
| 3,293,895 | A * | 12/1966 | Kohan et. al. | 72/46 |

(Continued)

OTHER PUBLICATIONS

Eveready Lighting products, Catalog, Spring 1983, 24 Pages.

(Continued)

*Primary Examiner* — Alexander P Taousakis

(74) *Attorney, Agent, or Firm* — Clement A. Berard, Esq.; Dann, Dorfman, Herrell & Skillman, PC

(57) ABSTRACT

A method for making a flashlight housing comprises providing a blank of an electrically conductive material, impact extruding the blank of electrically conductive material to form an elongated hollow member that has an internal cavity open at a first end and that has a reduced inner diameter portion proximate a second end thereof, and coating the elongated hollow member with a coating material. The flashlight housing may have a tail cap, and may have O-rings for sealing at the rearward end of the tail cap, at the forward end of the housing, and at the interface between the housing and the tail cap.

15 Claims, 4 Drawing Sheets

U.S. PATENT DOCUMENTS

| | | | |
|---|---|---|---|
| 3,835,272 | A | 9/1974 | Wisenbaker |
| 4,228,485 | A | 10/1980 | Hubbard |
| 4,290,095 | A | 9/1981 | Schmidt |
| 4,346,329 | A | 8/1982 | Schmidt |
| 4,487,983 | A | 12/1984 | Miller et al. |
| 4,841,417 | A | 6/1989 | Maglica et al. |
| 4,897,769 | A | 1/1990 | Lang |
| 4,939,628 | A | 7/1990 | Wang |
| 5,008,784 | A | 4/1991 | Wang |
| 5,131,775 | A | 7/1992 | Chen |
| 5,197,796 | A | 3/1993 | Moore |
| 5,303,133 | A | 4/1994 | Wagner |
| 5,499,172 | A | 3/1996 | Shiau |
| 5,642,932 | A | 7/1997 | Matthews |
| D403,451 | S | 12/1998 | Ting |
| D407,508 | S | 3/1999 | Chiu |
| D418,235 | S | 12/1999 | Houplain |
| D419,704 | S | 1/2000 | Ting |
| D430,321 | S | 8/2000 | Sharrah |
| 6,296,371 | B1 | 10/2001 | Shiau |
| D452,024 | S | 12/2001 | Sharrah |
| 6,347,878 | B1 | 2/2002 | Shiao |
| 6,402,340 | B1 | 6/2002 | Sharrah et al. |
| 6,491,409 | B1 | 12/2002 | Sharrah |
| 6,523,972 | B2 | 2/2003 | Sharrah et al. |
| 6,811,280 | B1 | 11/2004 | Sharrah |
| 6,857,758 | B1 | 2/2005 | Sharrah |
| D521,164 | S | 5/2006 | Sharrah |

OTHER PUBLICATIONS

Promo-lite, Brochure, Undated, 4 Pages.
Schiffer Publishing LTD, "Collecting Flashlight With Value Guide," Stuart Schneider, 1996, 23 Pages.
Streamlight, Inc., LED Lamp assembly, Drawing No. C130143, Mar. 1997.

* cited by examiner

STYLUS FLASHLIGHT HOUSING AND METHOD FOR MAKING SAME

This application is a division of U.S. patent application Ser. No. 29/178,984 filed Apr. 2, 2003 now U.S. Pat. No. Des. 521,164, which is a continuation of U.S. patent application Ser. No. 29/161,696 filed Jun. 3, 2002, now abandoned, and of U.S. patent application Ser. No. 10/238,807 filed Sep. 9, 2002, now U.S. Pat. No. 6,857,758, which is a division of U.S. patent application Ser. No. 10/047,536 filed Jan. 14, 2002, now U.S. Pat. No. 6,491,409, which is a division of U.S. patent application Ser. No. 09/511,876 filed Feb. 25, 2000, now U.S. Pat. No. 6,402,340, and hereby claims the priority thereof. Each of the foregoing applications is hereby incorporated herein in its entirety by reference.

The present invention relates to a flashlight housing and to a method for making same.

Flashlights are available in a wide variety of shapes and sizes, and tailored to a particular use or situation. However, two desires that continue to indicate the need for improved flashlights include the desire for small flashlights and longer useful life. For example, there is a desire for a flashlight that is of a size and shape to conveniently fit in a pocket, e.g., a shirt pocket. In addition, there is a desire for a flashlight that has a bright beam and that operates for a long time before needing to replace or recharge the battery. Also, consumers also want such flashlights to be durable and available at a reasonable cost.

Prior art pocket lights such as a typical pen-shaped light typically are about 1.3 to 2 cm in diameter and are quite heavy, principally due to the size and weight of the type AA (about 1.4 cm diameter) or type AAA (about 1 cm diameter) batteries therein. It would be desirable to have a flashlight of about 1 cm or less in diameter, which is closer to the diameter of typical pens and pencils also kept in a person's pocket. A further advantage of a smaller-diameter flashlight is the ability to shine the light into small spaces.

The desire for a small-diameter flashlight makes the inclusion of complex internal current-carrying conductors undesirable because they tend to increase the diameter of the light, as well as adding cost thereto, i.e. cost for material, cost for fabrication of the internal parts, and added cost for assembly of the flashlight.

Prior art flashlights typically employ filament-type lamps that have a filament that is electrically heated to glow to produce light, wherein the filament is suspended between supports. Typical filaments tend to be fragile, and often more so when they are heated to glowing. As a filament is used, the filament material may thin or become brittle, thereby increasing its susceptibility to breakage. Even high-light-output lamps such as halogen and xenon lamps employ a heated filament, albeit a more efficient light producer than is a conventional incandescent lamp filament. A solid-state light source, such as a light-emitting diode (LED), for example, does not have a heated filament and so is not subject to the disadvantages associated with lamp filaments, and such LEDs are now available with sufficiently high light output as to be suitable for the light source for a flashlight.

Accordingly, there is a need for a flashlight that can have a small diameter and that has a housing that can be made at a reasonable cost.

To this end, a method for making a flashlight housing may comprise providing a blank of an electrically conductive material; impact extruding the blank of electrically conductive material to form an elongated hollow member that has an internal cavity open at a first end and that has a reduced inner diameter portion proximate a second end thereof; and coating the elongated hollow member with a coating material.

According to another aspect of the invention, the flashlight housing of the present invention may comprise an elongated tubular member having an opening at each end thereof; a cylindrical tail cap threadingly engaging the elongated tubular member at a first end thereof, a pushbutton movable axially in an opening of the cylindrical tail cap, a first O-ring surrounding the pushbutton and engaging the pushbutton and the cylindrical tail cap for providing a seal therebetween; a solid state light source extending into the opening at a second end of the elongated tubular member; and a second O-ring surrounding the solid state light source and engaging the solid state light source and the elongated tubular member for providing a seal therebetween.

BRIEF DESCRIPTION OF THE DRAWING

The detailed description of the preferred embodiments of the present invention will be more easily and better understood when read in conjunction with the FIGURES of the Drawing which include.

Figure 1:
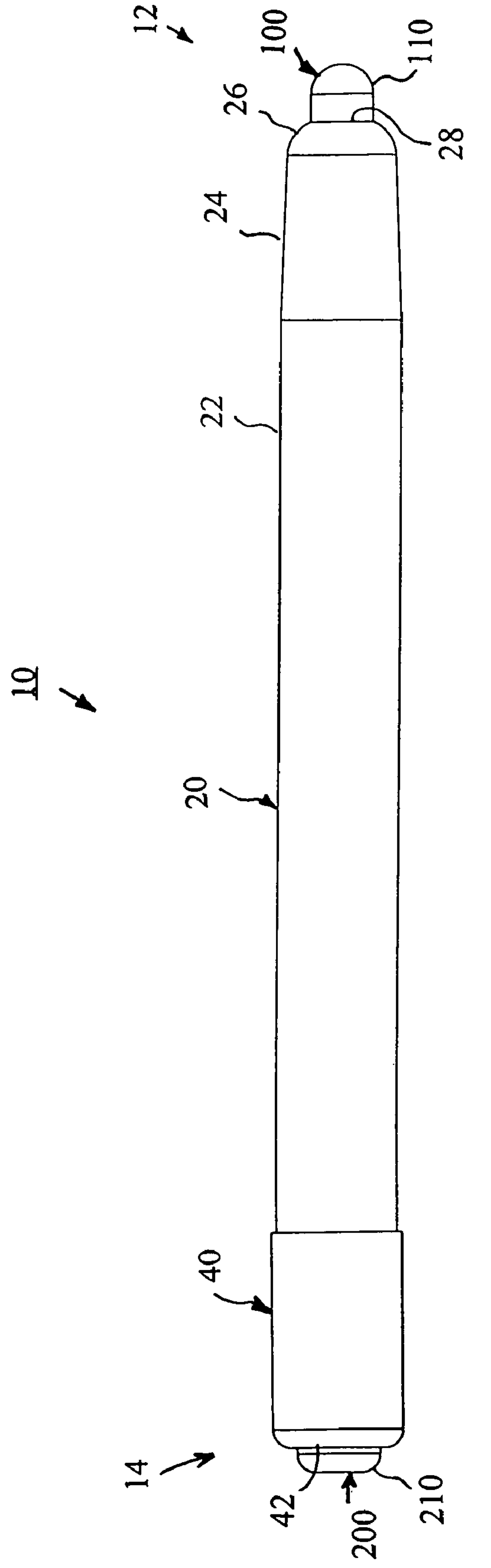
FIG. 1 is a side view of an exemplary embodiment of a flashlight in accordance with the present invention.

In the Drawing, where an element or feature is shown in more than one drawing figure, the same alphanumeric designation is used to designate such element or feature in each figure, and where a closely related or modified element is shown in a figure, the same alphanumerical designation primed may be used to designate the modified element or feature.

DESCRIPTION OF THE PREFERRED EMBODIMENT(S)

FIG. 1 is a side view of an exemplary embodiment of a flashlight 10 in accordance with the present invention. Flashlight 10 has a forward or head end 12 at which light is produced by a light source assembly 100 including a solid-state light source 110 such as an LED, and a rearward or tail end 14 at which is a tail switch assembly 200 including a pushbutton 210. Hollow cylindrical housing 20 of flashlight 10 has an elongated hollow cylindrical portion 22 and a hollow reduced inner diameter portion 24, for example, a tapered portion 24, proximate head end 12. Housing 20 is formed into a generally rounded forward end 26 at head end 12 and has a circular hole therein through which solid state light source 110 of light source assembly 100 projects in a forward direction. Cylindrical tail cap 40 overlies cylindrical housing 20 at the tail end 14 of flashlight 10 and has a circular hole 42 therein through which pushbutton 210 of tail switch assembly 200 projects in a rearward direction. Light source 100 is turned on by either depressing pushbutton 210 or by rotating tail cap 40 further onto housing 20.

Figure 2:
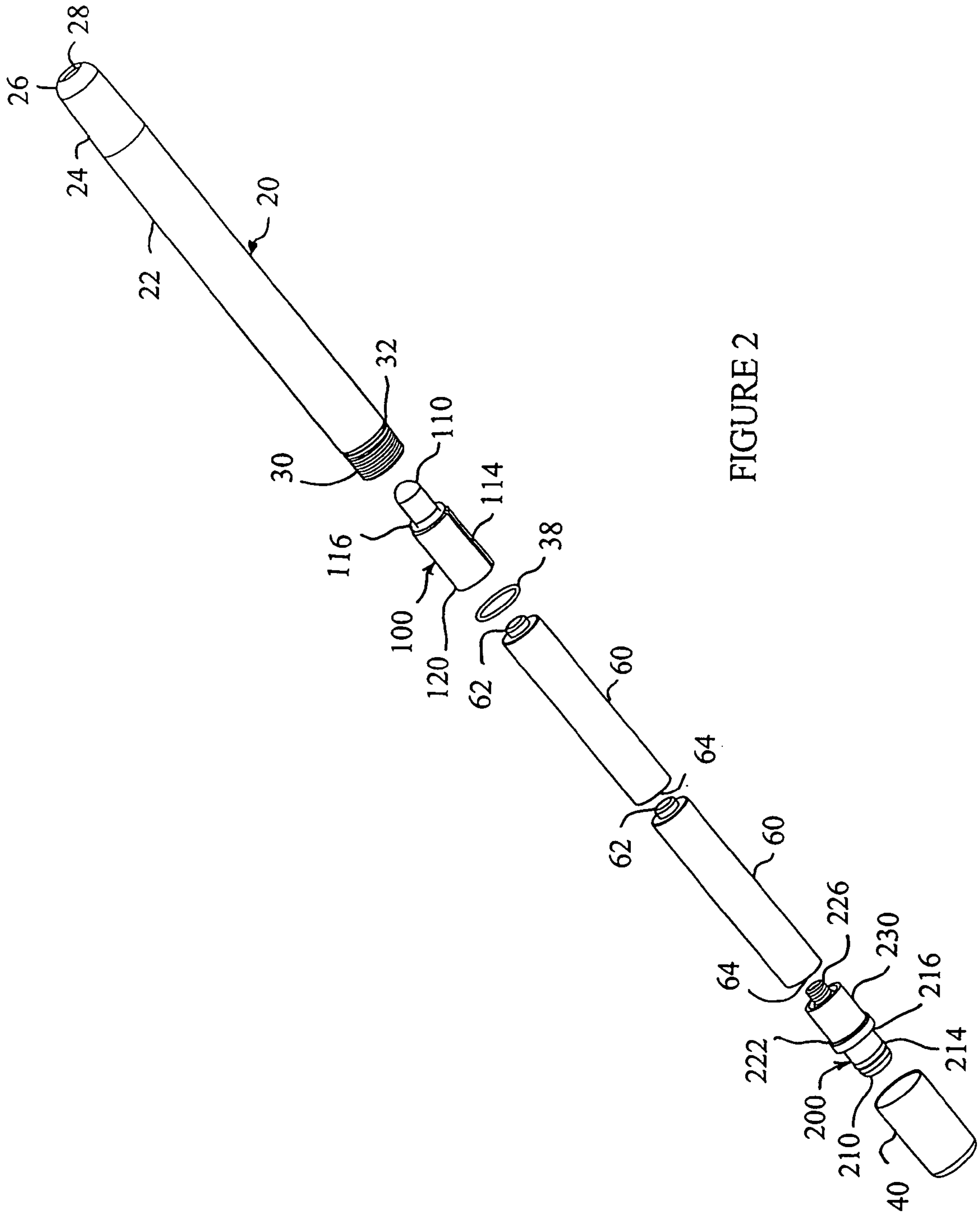
FIG. 2 is an exploded perspective view of the flashlight of FIG. 1.

FIG. 2 is an exploded perspective view of the flashlight 10 of FIG. 1 illustrating the external and internal components thereof. Hollow cylindrical housing 20 includes an elongated hollow cylindrical portion 22 and a hollow reduced inner diameter portion 24, for example, a tapered portion 24, proximate rounded forward end 26 thereof in which is formed circular hole 28 through which the light-emitting lens of light source 110 projects. Tubular housing 20 includes external threads 30 at the rearward end thereof for engaging the internal threads (not visible in FIG. 2) on the inner surface of tail cap 40. Housing 20 has a circumferential groove 32 forward of threads 30 for receiving a resilient O-ring 38 therein that provides a water-resistant seal between housing 20 and tail cap 40.

Internal components that slip inside the hollow cylindrical housing 20 include light source assembly 100 and batteries 60. Light source assembly 100 includes solid state light source 110 mounted in cylindrical base 120 with its electrical lead 114 in a longitudinal slot therein. Resilient O-ring 116 fits over light source 110 to provide a water-resistant seal between light source 110 and housing 20 when light source assembly is installed forward within housing 20 with O-ring 116 bearing against the internal forward surface thereof proximate circular hole 28. Batteries 60 each include a positive terminal 62 and a negative terminal 64 and are connected in series to provide a source of electrical energy for energizing light source 110 to cause it to produce light. Typically, two batteries 60 (as illustrated) or three batteries 60 are employed, although a greater or lesser number could be employed by appropriately lengthening or shortening the length of housing 20. Preferably, batteries 60 are of the type AAAA alkaline cells which provide a voltage of about 1.2-1.5 volts and have a diameter of about 0.8 cm or less. As a result, flashlight 10 has an outer diameter of only about 1 cm (about 0.38 inch), and is 12.6 cm (about 4.95 inches) long for a two-battery flashlight and 16.8 cm (about 6.6 inches) long for a three-battery flashlight, and operates for about 10 hours or more on a set of batteries.

The small outer diameter of flashlight 10 advantageously permits flashlight 10 to be "pocket-sized" in that it is of a size that permits it to be carried in a pocket or pouch, if so desired, although it need not be.

At the rearward or tail end 14 of flashlight 10, tail switch assembly fits inside the central cavity of tail cap 40 with circular pushbutton 210 of tail switch assembly 200 projecting through circular hole 42 in the rearward end thereof. Resilient O-ring 214 on pushbutton 210 provides a water-resistant seal between pushbutton 210 and tail cap 40 when pushbutton 210 is installed therein with O-ring 214 bearing against the interior surface of tail cap 40 proximate circular hole 42 therein.

Selective electrical connection between negative terminal 64 of rearward battery 60 and the rearward end metal housing 20 is made via outwardly extending circular metal flange 222 which is electrically connected to coil spring 226. When push button 210 is depressed or when tail cap 40 is screwed further onto threads 30 of housing 20 moving tail switch assembly 200 forward relative to housing 20, metal flange 222 comes into electrical contact with the rearward annular surface of cylindrical housing 20 thereby to complete an electrical circuit including batteries 60 and light source 110, to the end of applying electrical potential to solid state light source 110 to cause it to emit light.

Figure 3:
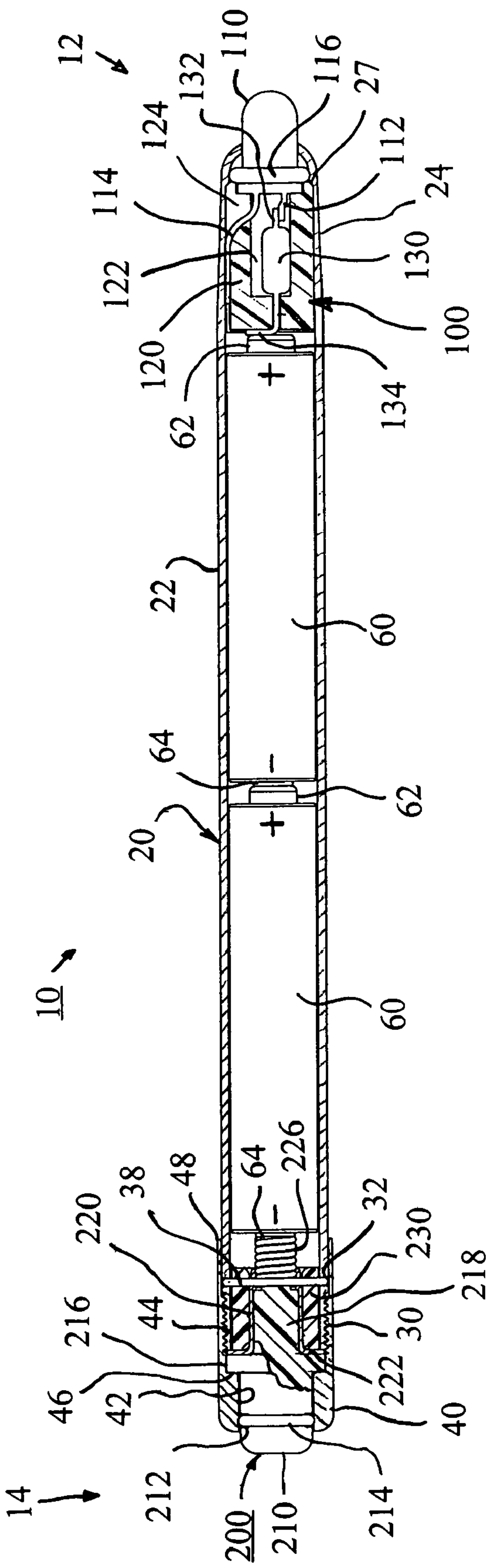
FIG. 3 is a side cross-sectional view of the flashlight of FIG. 1.

FIG. 3 is a side cross-sectional view of the flashlight 10 of FIG. 1 showing the relative positions of the external and internal components thereof when tail cap 40 is screwed onto threads 30 of housing 20 sufficiently to cause metal flange 222 to contact the rear end of housing 20, thereby to energize light source 110 to produce light as described above. Switch assembly 200 is free to move axially forward and rearward within housing 20 and tail cap 40, and does so under the urging of coil spring 226 and pressure applied to pushbutton 210. Unscrewing tail cap 40 moves tail cap 40 rearward and allows switch assembly 200 therein to also move rearward under the urging of spring 226, thereby breaking contact between metal flange 222 and the rear end of housing 20 and breaking the electrical circuit including batteries 60 and LED light source 110, thereby to de-energize light source 110 to stop the producing of light. Momentary switching (or blinking) action obtains from depressing/releasing pushbutton 210 when tail cap 40 is unscrewed slightly from the position illustrated in FIG. 3 and continuous on/off operation obtains by screwing tail cap 40 onto/away from housing 20 sufficiently to cause light assembly 110 to produce and not produce light.

Coil spring 226 urges batteries 60 forward causing their respective positive terminals 62 and negative terminals 64 to come into electrical contact and complete an electrical circuit between metal coil spring 226 and electrical lead 134 of light source assembly 100. In assembling flashlight 10, light source assembly 100 is inserted into housing 20 and is pushed forward causing electrical lead 114 thereof to come into physical and electrical contact with the interior surface of the wall of metal housing 20, e.g., by abutting housing 20 at shoulder 27. Light source assembly 100 is inserted sufficiently far forward to cause O-ring 116 to provide a seal between light source 110 and the interior surface of housing 20 proximate circular hole 28 therethrough. Light source assembly 100 is preferably a press fit into the tapered portion 24 of housing 20 owing to the contact of lead 114 and cylindrical body 120 with the interior surface of tapered portion 24.

Light source assembly 100 includes a solid state light source 110, preferably a light-emitting diode (LED). LEDs are available to emit light of one of a variety of colors, e.g., white, red, blue, amber, or green, and have extremely long expected lifetimes, e.g., 100,000 hours. Light source assembly 100 includes an insulating cylindrical body 120 having a central cavity 122 therein and a longitudinal slot 124 axially along one external surface thereof. LED light source 110 mounts into cylindrical body 120 with one electrical lead 114 thereof lying in slot 124 so as to come into physical and electrical contact with the interior surface of tapered portion 24 of cylindrical housing 20 and with the other electrical lead 112 thereof connected to lead 132 of electrical device 130 within central cavity 122 of cylindrical body 120. The other electrical lead 134 of electrical device 130 projects rearwardly out of the central cavity 122 of cylindrical body 120 to come into electrical contact with the positive terminal 62 of forward battery 60, thereby to complete an electrical circuit between battery 60 and metal housing 20 through LED light source 110. Electrical body 120 is preferably a rigid dielectric material such as a moldable plastic or ceramic, such as a glass-filled PBT plastic.

Electrical device 130 is preferably an electrical resistor with one of its leads 134 contacting battery 60 and the other of its leads 132 connected to lead 112 of LED light source 110 to limit the current that flows therethrough, thereby to extend the life of LED light source 110 and of batteries 60. Resistor 130 is preferably a carbon film resistor, and other types of resistors can be utilized. If a reverse potential were to be applied to LED light source 110, as could occur if batteries 60 were installed backwards, the diode action of LED light source 110 and resistor 130 prevent excess current flow in LED light source 110 that might otherwise cause the light-emitting diode therein to become degraded, damaged or burned out.

Tail switch assembly 200 is positioned within tail cap 40 at the rearward end 14 of flashlight 10. Tail switch assembly 200 includes a generally cylindrical pushbutton 210 of insulating plastic that includes a rearward cylindrical section that projects through hole 42 of tail cap 40 and has a circumferential groove 212 in which resilient O-ring 214 resides to provide a water resistant seal between pushbutton 210 and tail cap 40 proximate hole 42 therein. Tail cap 40 includes a cylindrical skirt 48 extending forwardly from internal threads 44 therein and extending along housing 20. Tail cap skirt 48 provides an inner surface for sealing tail cap 40 against O-ring 38, and also provides a greater length to tail cap 40 thereby making it easier to grip for rotating tail cap 40 relative to housing 20 to turn flashlight 10 on and off.

Pushbutton 210 also includes a central cylindrical section having a greater diameter than the rearward section thereof to provide an outwardly extending circular flange 216 that engages a corresponding shoulder 46 of tail cap 40 to retain pushbutton 210 captive therein. Forward cylindrical body section 218 of pushbutton 210 is preferably of lesser diameter than the rearward section and circular flange 216 thereof to receive a cylindrical metal ferrule 220 thereon. Metal ferrule 220 receives metal coil spring 226 in the forward cylindrical section thereof and includes circular flange 222 extending radially outward therefrom. Radial flange 222 comes into contact with the rearward end of housing 20 when pushbutton 210 is depressed or when tail cap 40 is rotated clockwise with respect to housing 20 to advance axially forward thereon due to the engagement of the external threads 30 on the external surface of housing 20 and the internal threads 44 of tail cap 40. Insulating plastic cylindrical ferrule 230 surrounds metal ferrule 220 and centers tail switch assembly within the central longitudinal cylindrical cavity of housing 20. Preferably, metal ferrule 220 is a tight fit over cylindrical body section 218 of pushbutton 210 and plastic ferrule 230 is a tight fit over metal ferrule 220 for holding together with a slight press fit, without need for adhesive or other fastening means.

Alternatively, body portion 218, metal ferrule 220 and insulating ferrule 230 may each be tapered slightly for a snug fit when slipped over each other, and metal ferrule 220 may be split axially so as to more easily be expanded and compressed for assembly over body portion 218 and securing thereon by ferrule 230. Metal ferrule 220 is preferably brass, but may be copper, aluminum, steel or other formable metal. Coil spring 226 is preferably stainless steel, but may be of steel, beryllium copper or other spring-like metal.

Housing 20 and tail cap 40 are metal so as to provide an electrically conductive path along the length of flashlight 10, and are preferably of aluminum, and more preferably of 6000 series tempered aircraft aluminum. Housing 20 and tail cap 40 are preferably coated for aesthetics as well as for preventing oxidation of the aluminum metal, and preferably are coated with a durable material such as an anodized finish, which is available in several attractive colors such as black, silver, gold, red, blue and so forth. While an anodized finish is hard and durable, it is not electrically conductive and so, absent the arrangement described, interferes with completing an electrical circuit including batteries 60 and light source 110 through housing 20.

Figure 4:
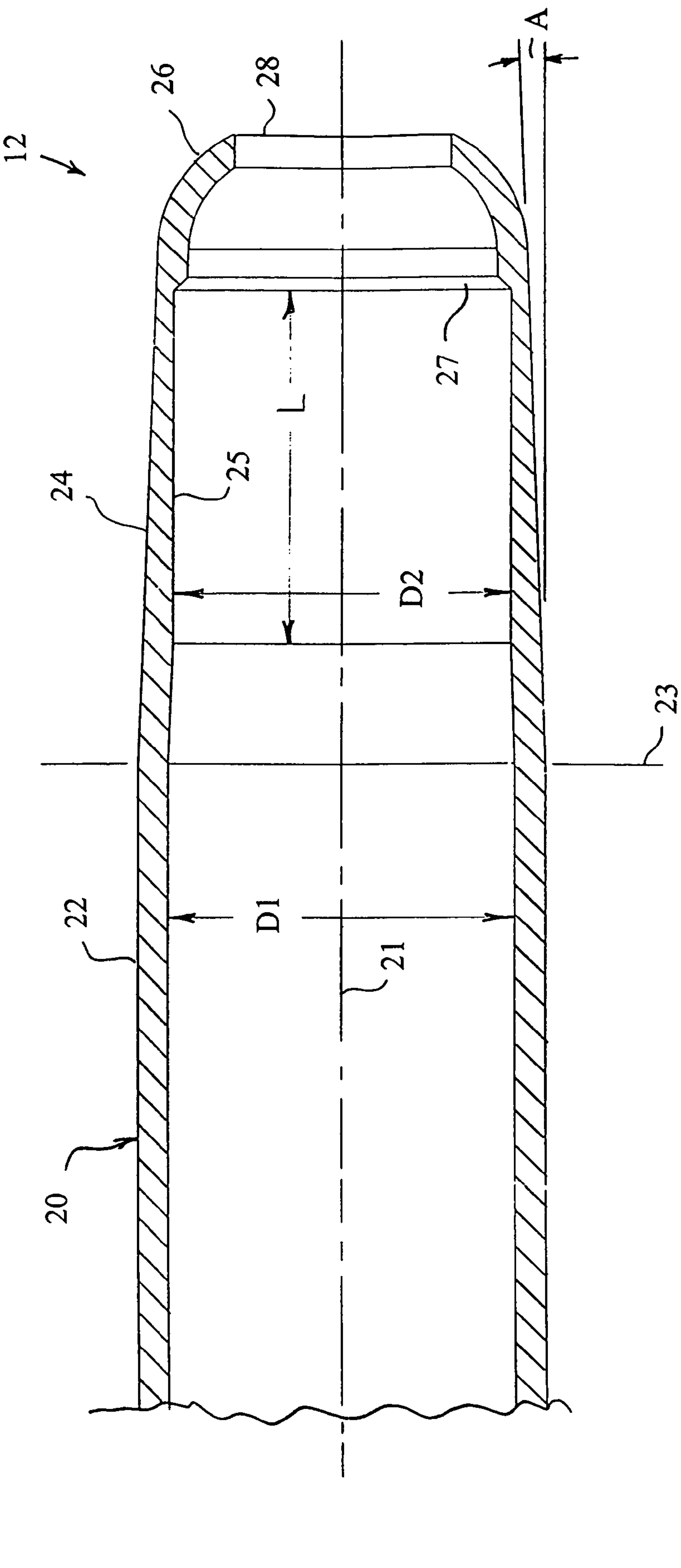
FIG. 4 is an enlarged side cross-sectional view of a portion of the barrel of the flashlight of FIG. 1.

To the end of providing one or more electrical connections to housing 20, FIG. 4 is an enlarged side cross-sectional view of a forward portion of housing 20 of the flashlight 10 of FIG. 1. Housing 20 is preferably formed from a cylindrical aluminum tube or tube stock, such as an extruded cylindrical tube, preferably an aluminum tube having an outer diameter of about 1 cm or less, as follows. A length of aluminum tube is cut to a length slightly longer than the axial length of housing 20 and one end thereof forward of break line 23 is roll formed, preferably cold roll formed, so as to have a slight narrowing taper, thereby forming tapered portion 24 of housing 20 having an inner diameter that is less than the inner diameter of the remainder of housing 20 proximate the forward or head end 12 thereof. A taper angle A of less than about 5° from the longitudinal center axis 21 is desirable. In fact, for an about 1 cm diameter tube, a taper of about 2° is preferred. Housing 20 is further roll formed at the head end 12 of tapered portion 24 to form a rounded forward end 26 having a narrowed-diameter opening therein that is trimmed, such as by drilling or boring, to provide circular hole 28 coaxially with housing centerline 21. The roll forming of tapered portion 24 and rounded end 26 may be performed in a single operation. Housing 20 is coated with the preferred anodized or other finish, preferably before the forming and subsequent operations.

Because the preferred anodized finish is not electrically conductive, it must be removed at locations on housing 20 at which electrical connection is to be made. To this end, the reduced inner diameter tapered forward portion 24 of housing 20 provides a particular advantage, it being noted that the rolling tapers both the outer and inner surfaces of tapered portion 24. Because the aluminum tube is tapered only at its forward end, the interior diameter of housing 20 is of uniform inner diameter D1 over its entire length except at tapered portion 24 forward of break line 23 where it has a reduced diameter. Thus, a reamer or boring tool of diameter D2 greater than the inner diameter of the reduced inner diameter portion 24 and less than the inner diameter D1 of the remainder of housing 20 will remove the insulating coating only in the reduced inner diameter portion 24 of housing 20 and form a ridge or shoulder 27 at the forward end thereof. A housing 20 so formed may have a cylindrical outer shape or other outer shape, as is desired. The clearance reamer or other boring tool is inserted into the interior of housing 20 from the tail end 14 thereof and through cylindrical portion 22 thereof and includes a cutting head that cuts a bore of diameter D2 that is less than the inner diameter D1 of cylindrical portion 22, and so does not cut within portion 22 and remove the electrically insulating coating therefrom, and may include a non-cutting guide of a diameter greater than D2, but less than D1, rearward of its cutting head for centering the boring tool substantially coaxially along centerline 21 of housing 20.

As the clearance reamer or boring tool advances forwardly into tapered portion 24, it cuts a cylindrical bore 25 of diameter D2 interior to tapered portion 24, thereby cutting through the non-conductive anodized coating to expose the conductive aluminum metal of housing 20, to provide a contact area to which electrical lead 114 of light source assembly 100 makes electrical contact when light source assembly 100 is inserted into housing 20 and advanced forwardly therein until light source 110 abuts, i.e. is proximate to, shoulder 27 and extends through hole 28. The diameter D2 and length L of bore 25 are selected to provide sufficient exposed aluminum contact surface in bore 25 while leaving sufficient thickness in the forward end of the wall of tapered portion 24 of housing 20. Typically, housing 20 has an outer diameter of about 0.95 cm, an inner diameter of about 0.80 cm, and bore 25 has a diameter D2 of about 0.79 cm and a length L of about 0.9-1.0 cm.

The rearward end 14 of housing 20 has external threads 30 formed on the outer surface thereof, such as by machining or cold forming, and the anodized finish is removed from rearward end of housing 20, such as by machining or grinding, so as to expose the metal of housing 20 to provide a location to which circular flange 222 of metal ferrule 220 can make electrical contact.

Alternatively, the boring tool utilized to cut bore 25 in tapered portion 24 may also include a second cutting head of lesser diameter located forward of the cutting head that cuts bore 25, wherein the second more-forward cutting head is utilized to bore hole 28 in a single operation with the cutting of bore 25.

While housing 20 has been described in terms of tapered portion 24 of housing 20 having an interior surface that is tapered so that a reamer or boring tool may be utilized to remove the electrically insulating anodize coating therefrom, any form of housing 20 having a reduced inner diameter portion 24 near the forward end 12 thereof that a reamer or boring tool or other like tool may be utilized to remove the electrically insulating coating therefrom. Thus, a housing having a reduced inner diameter portion 24 is satisfactory irrespective of whether or not the exterior surface of the reduced inner diameter portion 24 of housing 20 is of the same, smaller or larger outer diameter than is the rest of housing 20 and irrespective of whether the shape of the outer surface of reduced inner diameter portion 24 of housing 20 is the same as or different from the shape defined by the inner surface of reduced inner diameter portion 24 thereof.

Accordingly, housing 20 may be formed by thin-wall impact extrusion wherein a blank or preform of metal such as aluminum is deep drawn to form a cylindrical housing 20 having a cylindrical interior bore that is of a given diameter except at the forward end thereof at which it has a reduced inner diameter. The reduced inner diameter portion may be a tapered interior shape or may be a smaller diameter cylindrical bore, for example. In impact extrusion, which can be utilized in quickly forming relatively deep closed-ended metal objects such as food and beverage cans and cigar tubes, a blank of material to be extruded is forced into a cavity tool that has a cavity of substantially the same size and shape as the desired outer shape of the extruded object to determine the outer shape thereof. The blank is forced into the cavity of the cavity tool by a core tool that has an outer shape that is substantially the same size and shape as the desired inner surface of the extruded object. The shape and size of the elongated closed-ended tube so formed by impact extrusion is defined by the generally cylindrical gap between the cavity tool and the core tool when the core tool is fully driven into the cavity of the cavity tool, similarly to a mold. The extruded object is removed from the cavity and core tools and is trimmed to the desired length of the extruded object.

Housing 20 formed by impact extrusion is removed from the cavity and core tools and the rearward end thereof is cut to the desired length. The resulting extruded hollow tube is then coated with an insulating coating such as an anodize coating. Thus, a reamer or boring tool of diameter greater than the inner diameter of the reduced inner diameter portion 24 and less than the inner diameter of the remainder of housing 20 will remove the insulating coating only in the reduced inner diameter portion 24 of housing 20, and may include a portion forward of the reamer or boring tool portion for substantially contemporaneously cutting opening 28 in the forward end of housing 20. A housing 20 so formed by thin wall impact extrusion may have a cylindrical outer shape or other outer shape, as is desired.

Alternatively, housing 20 may be formed by boring or drilling an interior bore into a solid piece of material, such as a rod or bar of aluminum or other metal, for example. The drilling or boring of such deep small-diameter holes is usually referred to as "gun boring." The drilling or boring tool can have a smaller-diameter forward portion and a larger-diameter rearward portion so as to drill or bore a hole having a reduced inner diameter forward portion 24, which forward portion 24 may be a cylindrical bore or a tapered bore or other reduced inner diameter bore. Housing 20 is then coated with an insulating coating such as an anodize coating. Thus, a reamer or boring tool of diameter greater than the inner diameter of the reduced inner diameter portion 24 and less than the inner diameter of the remainder of housing 20 will remove the insulating coating only in the reduced inner diameter portion 24 of housing 20, and may include a portion forward of the reamer or boring tool portion for substantially contemporaneously cutting opening 28 in the forward end of housing 20. A housing 20 so formed by gun boring may have a cylindrical outer shape or other outer shape, as is desired.

Flashlight 10 as described provides the advantages of a very small diameter housing 20 and a relatively high intensity light source 110 that has very long useful life, e.g., in excess of 100,000 hours, and operates for a long time, e.g., over 10 hours, on a set of batteries. An additional advantage obtains due to the water resistance provided by O-rings 116, 38 and 214 providing seals between the light source 110 and housing 20, tail cap 40 and housing 20, and pushbutton 210 and tail cap 40, respectively.

While the present invention has been described in terms of the foregoing exemplary embodiments, variations within the scope and spirit of the present invention as defined by the claims following will be apparent to those skilled in the art. For example, a clip may be installed onto housing 20 to provide a simple means for securing flashlight 10 in the pocket of a user's garment or apron or the like. In addition, either or both of housing 20 and tail cap 40 may be knurled to provide a better gripping surface for facilitating the relative rotational movement of housing 20 and tail cap 40 for the turning on and off of flashlight 10.

In addition, protective electrical resistor 130 of light source assembly could be eliminated or could be replaced by another electrical device, e.g., a field-effect transistor current limiter, that would limit the current that could flow through LED light source 110 to a safe level.

What is claimed is:

1. A method for making a flashlight housing comprising the steps of:

providing a blank of an electrically conductive material;

deep drawing the blank of electrically conductive material to form an elongated hollow member that has an internal cavity open at a first end and that has a reduced inner diameter portion proximate a second end thereof;

coating the elongated hollow member with a coating material; and drilling or boring the reduced inner diameter portion of the elongated hollow member at least for removing coating material from the reduced inner diameter portion.

2. The method of claim 1 wherein said deep drawing comprises forming the internal cavity utilizing a core tool defining the internal cavity and the reduced inner diameter portion of the elongated hollow member.

3. The method of claim 1 further comprising making a circular opening in the second end of the elongated hollow member.

4. The method of claim 1 wherein the blank of electrically conductive material includes aluminum and wherein the coating material includes aluminum anodize.

5. The method of claim 1 wherein said coating the elongated hollow member includes applying an anodize finish.

6. The method of claim 1 further including removing the coating material from an end of said elongated hollow member remote from the reduced inner diameter portion thereof.

7. The method of claim 1 further including providing threads at the first end of the elongated hollow member.

8. A method for making an elongated flashlight housing comprising the steps of:

providing a blank of an electrically conductive material;

providing a core tool having a portion defining an internal cavity and having a portion defining a reduced inner diameter portion at a forward end of the internal cavity;

deep drawing the blank of electrically conductive material with the core tool to form an elongated cylindrical hollow tube of electrically conductive material;

wherein the elongated cylindrical hollow tube has an internal cavity, has a reduced inner diameter portion at the forward end of the internal cavity, and has a rounded forward end;

drilling or boring a longitudinal cavity in the reduced inner diameter portion of the elongated cylindrical hollow tube; and forming an opening through the rounded forward end of the elongated cylindrical hollow tube including drilling or boring a circular hole in the rounded end of the elongated cylindrical hollow tube.

9. The method of claim 8 further comprising coating the elongated cylindrical hollow tube with a coating material, wherein the coating material does not cover a portion of an inner surface of the reduced inner diameter portion at a forward end of the internal cavity of the elongated cylindrical hollow tube.

10. The method of claim 8 further including providing threads at an end of the elongated cylindrical hollow tube remote from the forward end thereof.

11. A method for making an elongated flashlight housing comprising the steps of providing a blank of an electrically conductive material;

providing a core tool having a portion defining an internal cavity and having a portion defining a reduced inner diameter portion at a forward end of the internal cavity;

deep drawing the blank of electrically conductive material with the core tool to form an elongated cylindrical hollow tube of electrically conductive material;

wherein the elongated cylindrical hollow tube has a narrowing exterior taper at a forward end thereof, has an internal cavity, has a reduced inner diameter portion at the forward end of the internal cavity, and has a rounded forward end;

drilling or boring a circular hole in the rounded forward end of the elongated cylindrical hollow tube, coating the elongated cylindrical hollow tube with a coating material; and after said coating, then drilling or boring a longitudinal cavity in the reduced inner diameter portion of the elongated cylindrical hollow tube, wherein coating material, if any, on the reduced inner diameter portion is removed.

12. The method of claim 11 wherein the blank of electrically conductive material includes aluminum and wherein the coating material includes aluminum anodize.

13. The method of claim 11 wherein said coating the elongated cylindrical hollow tube includes applying an anodize finish.

14. The method of claim 11 further including removing the coating material from an end of the elongated cylindrical hollow tube remote from the forward end thereof.

15. The method of claim 11 further including providing threads at an end of the elongated cylindrical hollow tube remote from the forward end thereof.

* * * * *